United States Patent
Izuhara et al.

[19]

[11] Patent Number: 6,090,323
[45] Date of Patent: Jul. 18, 2000

[54] METHOD FOR MANUFACTURING CARD PRODUCT

[75] Inventors: Hiroshi Izuhara; Daigo Tukahara, both of Osaka, Japan

[73] Assignee: Navitas Co., Ltd., Osaka, Japan

[21] Appl. No.: 09/019,742

[22] Filed: Feb. 6, 1998

[51] Int. Cl.[7] ............................. B29C 45/14; B29C 45/70
[52] U.S. Cl. ..................... 264/255; 264/263; 264/272.15
[58] Field of Search ..................... 264/250, 255, 264/271.1, 272.11, 272.15, 272.17, 263, 267, 273; 425/112, 116, 544

[56] References Cited

U.S. PATENT DOCUMENTS

| | | | |
|---|---|---|---|
| 4,980,115 | 12/1990 | Hatakeyama et al. | 264/328.7 |
| 5,134,773 | 8/1992 | LeMaire et al. | 29/827 |
| 5,154,872 | 10/1992 | Masui et al. | 264/266 |
| 5,164,144 | 11/1992 | Rose | 264/511 |
| 5,350,553 | 9/1994 | Glaser et al. | 264/255 |
| 5,401,457 | 3/1995 | Valyi | 264/511 |
| 5,417,905 | 5/1995 | Lemaire | 264/139 |
| 5,770,134 | 6/1998 | Hara et al. | 264/154 |
| 5,795,526 | 8/1998 | Matsumoto et al. | 264/266 |
| 5,800,763 | 9/1998 | Hoppe et al. | 264/255 |
| 5,820,813 | 10/1998 | Hara et al. | 264/511 |
| 5,830,402 | 11/1998 | Harada et al. | 264/266 |

FOREIGN PATENT DOCUMENTS

| | | |
|---|---|---|
| 0 412 893 A1 | 2/1991 | European Pat. Off. . |
| 0 488 485 A2 | 6/1992 | European Pat. Off. . |
| 0 570 062 A1 | 11/1993 | European Pat. Off. . |
| 0 606 118 A2 | 7/1994 | European Pat. Off. . |
| 0 703 052 A1 | 3/1996 | European Pat. Off. . |

OTHER PUBLICATIONS

Patent Abstracts of Japan; vol. 011, No. 125 (M–582), Apr. 18, 1987 & JP 61 268416 A (Riyouden Kasei KK; Others; 01), Nov. 27, 1986 *abstract*.

*Primary Examiner*—Angela Ortiz
*Attorney, Agent, or Firm*—Armstrong, Westerman, Hattori, McLeland & Naughton

[57] ABSTRACT

A manufacturing method and a manufacturing apparatus for a card product such as a non-contact IC card product in which a circuit sheet is coated with a synthetic resin layer, in good efficiency and with a possibility to reduce the manufacturing cost of the product. The manufacturing apparatus has fixed molds 20 and a movable mold 30 which can freely approach or alienate from the other. The movable mold 30 has a piston 33 for reciprocal sliding movement in the movable mold 30 in the direction of approach and alienation. The fixed mold 20 has an injection port 22 for injecting the molten resin, and a concave part 23 is formed on the outer peripheral part surrounding the fixed mold end part opposite to the piston 33. To this concave part 23 there can be fitted a spacer 24 having the same face as the fixed type end face 20*a* or a spacer for replacement 242 which is replaceable with the spacer 24, and has a projected end face 242*a* of a certain height from the fixed mold end face 20.

6 Claims, 12 Drawing Sheets

METHOD FOR MANUFACTURING CARD PRODUCT

BACKGROUND OF THE INVENTION

1. Field of the Invention

The present invention relates to a method for manufacturing a card product having a predetermined function, e.g., an IC card of non-contact type in which an electric circuit, including an IC chip, or the like, in the substrate and the circuit, is made by coating with a synthetic resin layer, and an apparatus for manufacturing it.

2. Description of Prior Art

In recent years, there has been practically used an IC card having a data writing function and a reading function. Such an IC card has a constitution in which an IC chip or an IC module is set in a synthetic resin substrate. In Japanese Patent Publication 8-71092 there is disclosed that, in a method for manufacturing a substrate for an IC card, a synthetic resin substrate having a concave part for imbedding an IC module is molded by using an injection compression molding technique. According to this manufacturing technique, there are required a process for manufacturing a substrate and a process for bonding an IC module to the substrate.

By the way, according to the above method, both the process for manufacturing a substrate and the process for bonding an IC module to the substrate require high level technique, so that its manufacture necessitates tremendous cost.

Furthermore, in recent years, there has been considered a non-contact type IC card made by imbedding an IC chip in a substrate and operating signals for input and output to and from the IC chip through an antenna. The IC card of such type is formed by previously manufacturing an electric circuit including an IC chip and an antenna as a circuit sheet, and then coating the circuit sheet with a synthetic resin layer. Such an IC card cannot be manufactured by the method as described above of bonding an IC module to a substrate provided in advance with a concave part.

SUMMARY OF THE INVENTION

The present invention has been made to solve the above problems, and its object is to provide a manufacturing method and a manufacturing apparatus for a card product incorporated with an electric circuit, such as IC chip, especially, a card product in which a circuit sheet is coated with a synthetic resin layer, in good efficiency and with a possibility to reduce the manufacturing cost of the product.

In order to attain the above object, the method for manufacturing a card product according to the present invention is a method for manufacturing a card product in which a circuit-carrying surface of a circuit sheet made by carrying an electric circuit on a base film is coated with a synthetic resin layer, characterized in that there are provided a fixed mold having an injection hole for injecting a molten resin and a movable mold having a concave part of a certain depth at the end face opposite to the fixed mold, a piston which shows reciprocating sliding motion in the direction of the end face of the fixed mold, and the movable mold can freely approach and retracting from the fixed mold, using the molds, comprising the steps (1) to (4) as follows.

(1) receding the end face of the piston by a predetermined amount from the end face of the movable mold and supplying the circuit sheet in a manner that the base film comes into tight contact with the end face of the fixed mold which is opposite to the concave part at the end face of the piston, clamping the molds under the condition;

(2) injecting into a space between the circuit sheet brought into direct contact with the end face of the fixed mold and the concave part in the movable type piston end face, the molten resin of an amount corresponding to the volume of the space;

(3) sliding the piston in the direction of the fixed mold so that the face of the piston comes into direct contact with the end face of the fixed mold, while compressing the molten resin, and by which spreading the molten resin over the cavity constituted by the concave part of the piston end face and end face of the fixed mold;

(4) curing the molten resin and opening the molds.

With this constitution, by the reciprocal sliding of the piston, i.e., by retraction of the piston, there is formed a cavity for forming a synthetic resin layer, and by the advance of the piston, the molten resin in the cavity is compression-molded. Accordingly, there can be obtained in good efficiency a card product in which the surface on the circuit-carrying surface of the circuit sheet is coated with a synthetic resin layer.

Also, in the above method, prior to the clamping, it is possible to supply a cover sheet to the bottom face of the concave part of the above piston end face. In this case, there can be obtained in good efficiency a card product in which the face on the circuit-carrying side of the circuit sheet is coated with a synthetic resin layer, and on the surface of the synthetic resin layer the above cover sheet is stuck.

Alternatively, in the above method, prior to the above clamping, a transfer film may be supplied to the bottom face of the concave part of the above piston end face prior to the clamping. In such a case, there can be obtained in good efficiency a card product in which the circuit carrying side surface of the circuit sheet is coated with a synthetic resin layer, and a predetermined pattern, or the like, is transferred to the surface of the synthetic resin layer from the transfer film.

Furthermore, the method for manufacturing a card product according to the present invention may be a method for manufacturing a card product in which a circuit carrying surface of a circuit sheet made by carrying an electric circuit on a base film is coated with a synthetic resin layer, characterized in that there are provided a fixed mold having an injection hole for injecting a molten resin and a movable mold having a concave part of a certain depth at the end face opposite to the fixed mold, a piston which undergoes reciprocating sliding motion in the direction of the end face of the fixed mold, and the movable mold can freely approach and retract from the fixed mold, comprising the steps (1) to (8) as follows.

(1) retracting the end face of the piston by a predetermined amount from the end face of the movable mold and supplying the circuit sheet in a manner that the base film comes into tight contact with the end face of the fixed mold which is opposite to the concave part at the end face of the piston, clamping the molds under the condition;

(2) injecting into a space between the circuit sheet brought into direct contact with the end face of the fixed mold and the concave part in the movable type piston end face, the molten resin of an amount corresponding to the volume of the space;

(3) sliding the piston in the direction of the fixed mold so that the face of the piston comes into direct contact with the end face of the fixed mold, while compressing the molten resin, and by which spreading the molten resin over the cavity constituted by the concave part of the piston end face and end face of the fixed mold;

(4) curing the molten resin to form an intermediate molding product in which one side surface of the circuit sheet is coated with a synthetic resin layer and opening the molds;

(5) retracting the end face of the piston by a predetermined amount from the end face of the movable mold under the condition where the intermediate molding product is held in the concave part of the movable mold piston, and clamping the molds so at to bring the end face of the movable mold into direct contact with the outer peripheral part of the fixed mold concave part to be formed so that the fixed mold concave part is formed on the fixed mold end face part opposite to the concave part the position;

(6) injecting into a space between the concave part formed on the end face of the fixed mold a molten resin of an amount corresponding to the volume of the space and the intermediate molding product is injected into the space formed on the end face of the fixed mold.

(7) sliding the piston in the direction of the fixed mold so that the end face of the piston comes into direct contact with the projecting surface while compressing the molten resin again and by which spreading the molten resin over the cavity constituted by the concave part formed on the end face of the fixed mold and the above intermediate molding product;

(8) curing the molten resin and opening the molds.

According to the method, by constituting a projection on the concave part formed on the fixed mold, the reverse surface of the circuit sheet can be easily coated with a synthetic resin layer, and accordingly, a card product having coating on both surfaces of the circuit with the synthetic resin layers can be produced.

In this method alike, it is possible, prior to the first mold clamping, to supply a cover sheet to the bottom surface of the concave part of the above piston end face, and also, prior to the second mold clamping, to supply a cover sheet to the bottom surface of the concave part of the above fixed mold. In this case, it is possible to obtain a card product wherein a cover sheet is applied to the surface of the synthetic resin layer coated on both sides of the circuit sheet.

Alternatively, in this method also, it is possible to supply a transfer film to the bottom face of the concave part of the piston before the first mold clamping, and to supply a transfer film to the bottom face of the fixed mold before the second mold clamping. In this case, it is possible to obtain a card product in which predetermined design patterns, and the like, are transferred respectively to the surface of the synthetic resin layer coated on both surfaces of the circuit sheet from the circuit sheet.

Also, the apparatus for manufacturing a card product according to the present invention is an apparatus for manufacturing a card product in which at least a circuit-carrying side surface of a circuit sheet carrying an electric circuit on a base film is coated with a synthetic resin layer, characterized by having a fixed mold and a movable mold which are disposed opposite to each other and free to approach and retract from each other, the movable mold being provided with a piston which slides reciprocally in the movable mold in the direction of approach and retraction, and the fixed mold having an injection hole for injecting a molten resin, and a projecting part having a projecting end face of a certain height from the end face of the fixed mold on an outer peripheral part surrounding the end face of the fixed mold opposite to the piston.

In this manufacturing apparatus, the constitution may be such that a projecting part is provided with a concave part on the outer peripheral part surrounding the end face of the fixed mold opposite to the piston, and the concave part is furnished with a freely detachable member having a projecting end face of a certain height from the end face of the fixed mold. Alternatively, instead of this constitution, the projecting part may be of such constitution that a concave part is formed on the outer peripheral part surrounding the end face of the fixed mold opposite to the piston, so that a member having the end face which forms the same face as the above end face of the fixed mold is stored in the concave part, and so that a mechanism is projected the member from the end face of the fixed mold by a fixed height.

By the manufacturing apparatus having the above constitution, the manufacturing method of the present invention as described above is realized. The manufacturing apparatus of the present invention has a simple construction without necessitating a high level technique in using it, and is cost saving.

DESCRIPTION OF PREFERRED EMBODIMENT

Figure 1:
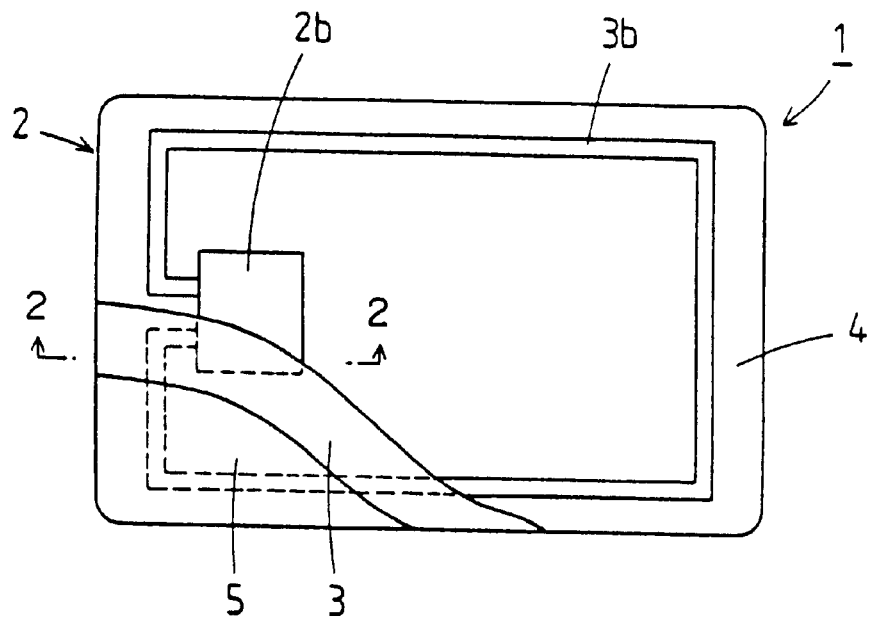
FIG. 1 is an explanatory view to explain an example of the IC card to be manufactured by the present invention.

Hereinafter, a preferred embodiment of the present invention is described referring to the drawings.

Figure 2:
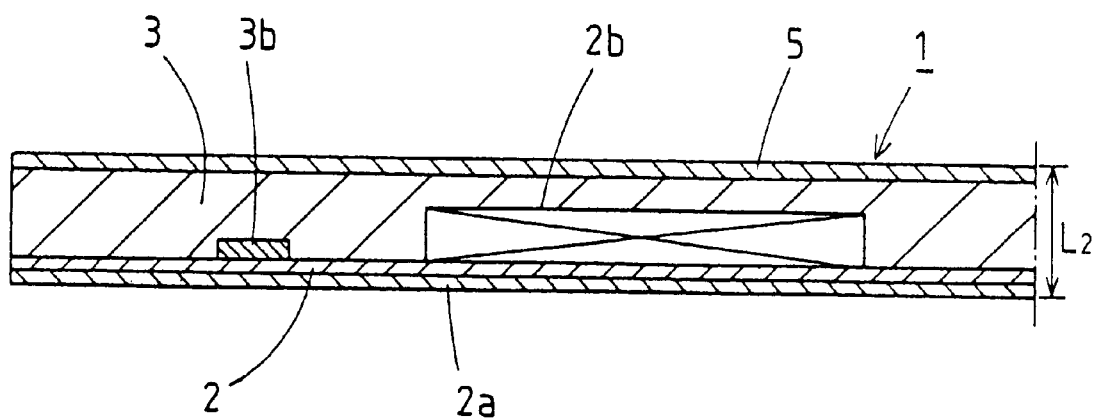
FIG. 2 is a sectional view taken along the line B—B in FIG. 1.
Figure 3:
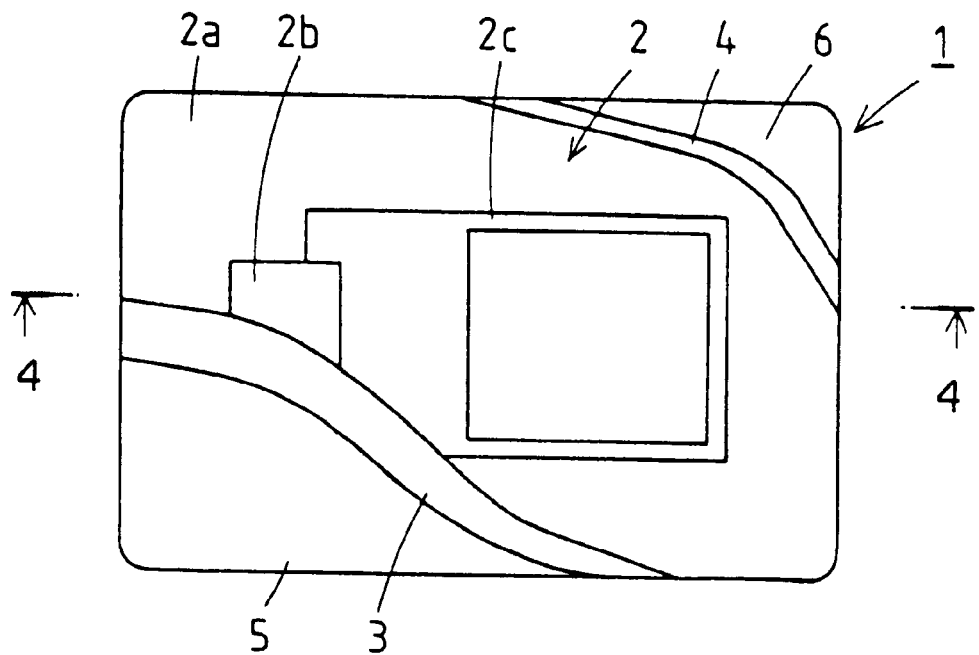
FIG. 3 is another view to explain an example of the IC card to be manufactured by the present invention.
Figure 4:
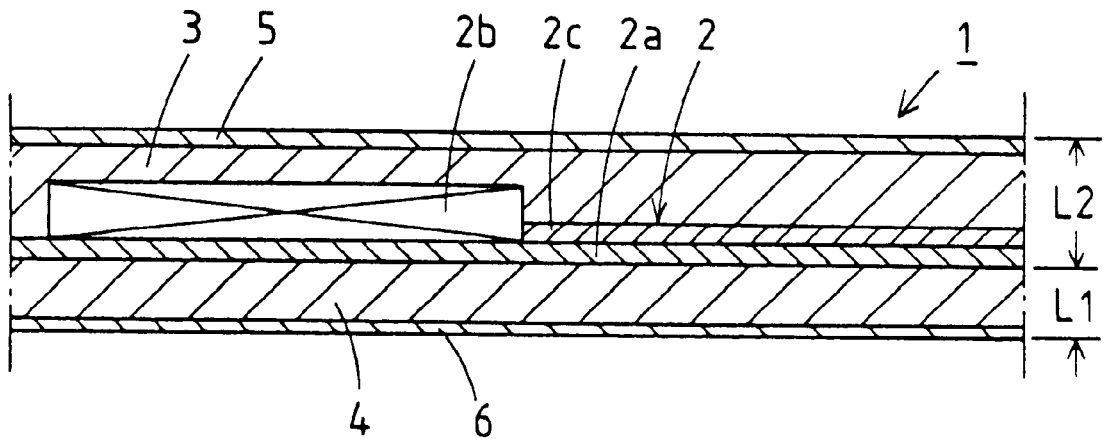
FIG. 4 is a sectional view taken along the line A—A in FIG. 3.

First, the constitution of the IC card to be manufactured according to the manufacturing method and manufacturing apparatus under this embodiment is shown in FIG. 1 and FIG. 2, and other constitution examples are shown in FIG. 3 ad FIG. 4.

First, the IC card 1 shown in FIG. 1 and FIG. 2 has a constitution wherein there is formed the synthetic resin layer 3 on one side of the circuit sheet 2 carrying an electric circuit including an IC chip 2b and an antenna 3b on base film 2a, and further, the cover sheet 5 bearing the predetermined color, pattern, character, design, etc. are applied to the surface of the synthetic resin layer 3.

Figure 5:
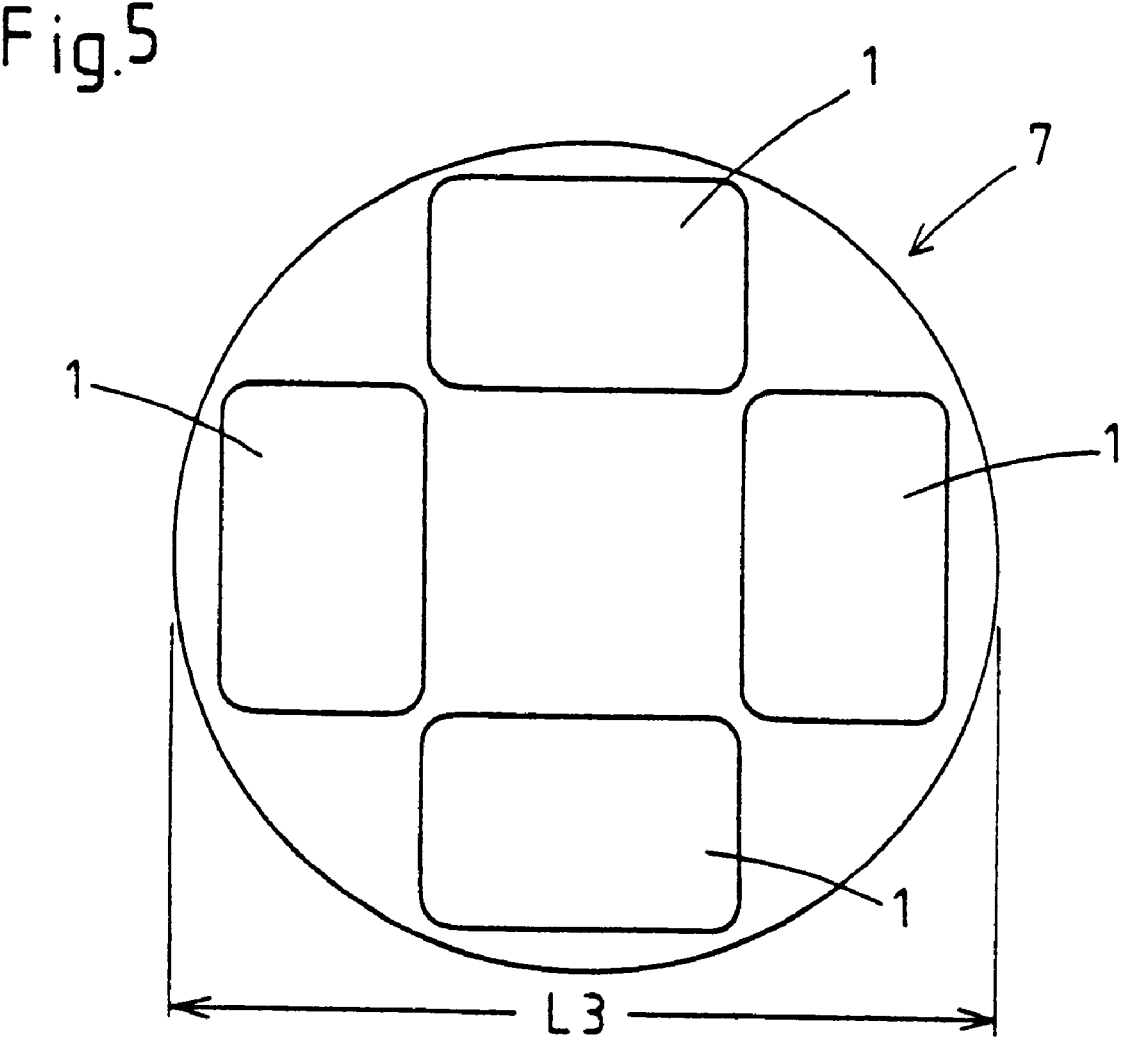
FIG. 5 is an explanatory view of a product obtainable according to the manufacturing method and the manufacturing apparatus of the present invention.

Also, the IC card 1 shown in FIG. 3 and FIG. 4, has a constitution wherein there are formed the synthetic resin layers 3, 4 respectively on both sides of the circuit sheet 2 carrying the electric circuit including an IC chip 2b and an antenna 2c on both sides of film 2a, and further the cover sheets 5, 6 bearing the predetermined color, pattern, character, design, etc. are applied to the surfaces of these synthetic resin layers 3, 4. In the IC card manufacturing apparatus of the embodiment of the present invention, as shown in FIG. 5, there is manufactured a disk 7 with which four of these IC cards 1 of a kind are formed in a single process.

Next, the IC card manufacturing apparatus of this embodiment is explained with reference to FIG. 6.

This manufacturing apparatus 10 has a pair of fixed molds 20 and a movable mold 30 which can freely approach or retract from the fixed molds 20. These fixed molds 20 and movable mold 30 are disposed with their end faces 20a, 30a opposite to one another. The movable mold 30 is driven by a non-illustrated cylinder, and it approaches or retracts.

On the back side of the fixed mold 20 there is mounted an injection nozzle 21 for molten resin. At the tip of the injection nozzle 21 there is provided an injection port 22 which penetrates through the central part of the end face 20a of the fixed mold 20. Further, on the end face 20a of the fixed mold 20, there is provided an annular concave groove 23 centering on the opening of the injection port 22. An annular spacer 24 is fixed by engaging in the concave groove 23. Now, with respect to the spacer 24, replacement is possible between the spacer 241 wherein the front end face 241a coincides with the end face 20a as shown in solid line and the spacer for replacement 242 in which, as show in alternate long and two short dashes, front end face 242a projects from the end face 20a of the fixed mold 20 by a predetermined amount, when it is engaged with the concave groove 23. When the spacer 242 for replacement is fitted, a concave part having a depth equal to the projection amount of the front end face 242a is to be formed in the inside, and the depth of this concave part 5 corresponds to the total L1 of the synthetic resin layer 4 formed on the reverse side of the circuit sheet 2 in the IC card 1 shown in FIG. 6 and the cover sheet 6.

On the other hand, the movable mold 30 has a base member 31, a body 32 combined with the front face of the base member 31 (direction of access of the movable mold 30 to the fixed mold 20 is to be taken as forward), and a piston 33 which is engaged in the cylinder 32a provided in the body 32 in a manner that reciprocal movement is feasible. With respect to the engaging face between the piston 33 and the cylinder 32a, the front part diameter is smaller than the rear part diameter, and by the difference of the diameters a step difference 32d is formed. By the step difference 32d and the cylinder 32a, a working pressure chamber for retraction 34 is provided. There is a constitution that the piston 33 is to be retracted by the working pressure supplied from outside to the working pressure chamber for retraction 34 through the passage 35. And, it is so set that the front end face 33a of the piston 33 is receded by a predetermined amount from the end face 32b of the body 32 at the illustrated position at which the rear end face 33j of the piston 33 is i tight contact with the base member 31.

Also, between the rear end face 33h of the piston 33 and the base member 31 there is provided a working pressure chamber for advance 36, and it is so set that the piston 33 is advanced at least to a position where the front end face 33a of the piston 33 comes to be flush with the end face 32b of the body 32.

Furthermore, at the front end face 33a of the piston 33 there is provided a circular concave part 33b of a certain depth. The depth of this concave part 33b corresponds to the thickness L2 from the base film 2a to the cover sheet 5 of the circuit sheet 2 i the IC card 1 shown in FIGS. 2 and 4, and its diameter is equal to the inner diameter of the annular spacer 24 on the fixed mold 20 side, and these correspond to the diameter L3 of the disk 7 shown in FIG. 5.

This movable mold 30 is provided with a plurality of eject pins 38 . . . 38 whose tips reach the bottom surface of the concave part 33b thrusting through the piston 33 i the reciprocating sliding direction. These eject pins 38 . . . 38 project in the direction of advance of the movable mold 30 from the illustrated position by the cylinders 39 . . . 39 which are disposed on the back side of the base member 31.

On the peripheral part of the bottom surface of the concave part 33b in the piston 33 there is provided a small hole 33c for holding the intermediate molding product. In this embodiment, the bottom part of the concave part 33b of the piston 33 is constituted by a member 33d different from the piston 33 body.

Next, a method for manufacturing the disk 7 including the IC cards shown in FIG. 1 and FIG. 2 using this manufacturing apparatus 10, is explained with reference to FIGS. 7 to 9.

Figure 7:
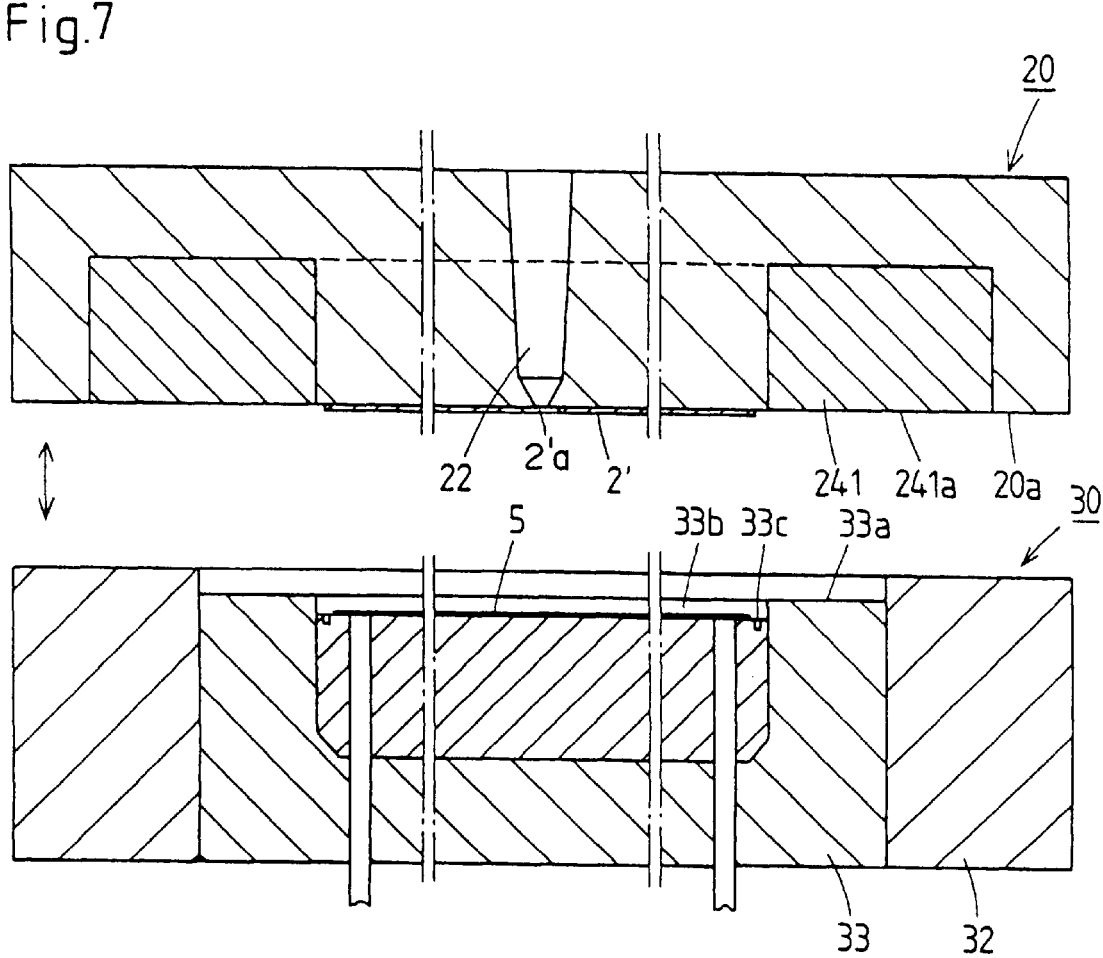
FIG. 7 is a sectional view of the manufacturing apparatus showing the condition prior to the first mold clamping out of the process of the manufacturing method using the manufacturing apparatus shown in FIG. 6.

First, as shown in FIG. 7, the fixed mold 20 and the movable mold 30 are opened, and under the condition where the piston 33 in the movable mold 30 is retracted, a circular circuit sheet 2' for four IC cards corresponding to the disk 7 of FIG. 3 is supplied to the central part of the end face 20a of the fixed mold 20 under the condition where the base film side thereof is brought into contact with the end face 20a. Also, in the concave part 33b of the piston 33 in the movable mold 30, a cover sheet 5' for four IC cards on which the predetermined color, pattern, character, symbol, etc. are printed in advance is supplied so as to lie along the bottom face of the concave part 33b.

Here, as a spacer 24 in the fixed mold 20, there is fitted a spacer 241 whose front end face 241a becomes flush with the end face 20a of the fixed mold 20. Also, at the central part of the circular circuit sheet 2', there is fitted a central through hole 2'a at the position corresponding to the opening of the injection port 22 in the end face 20a of the fixed mold 20.

Figure 8:
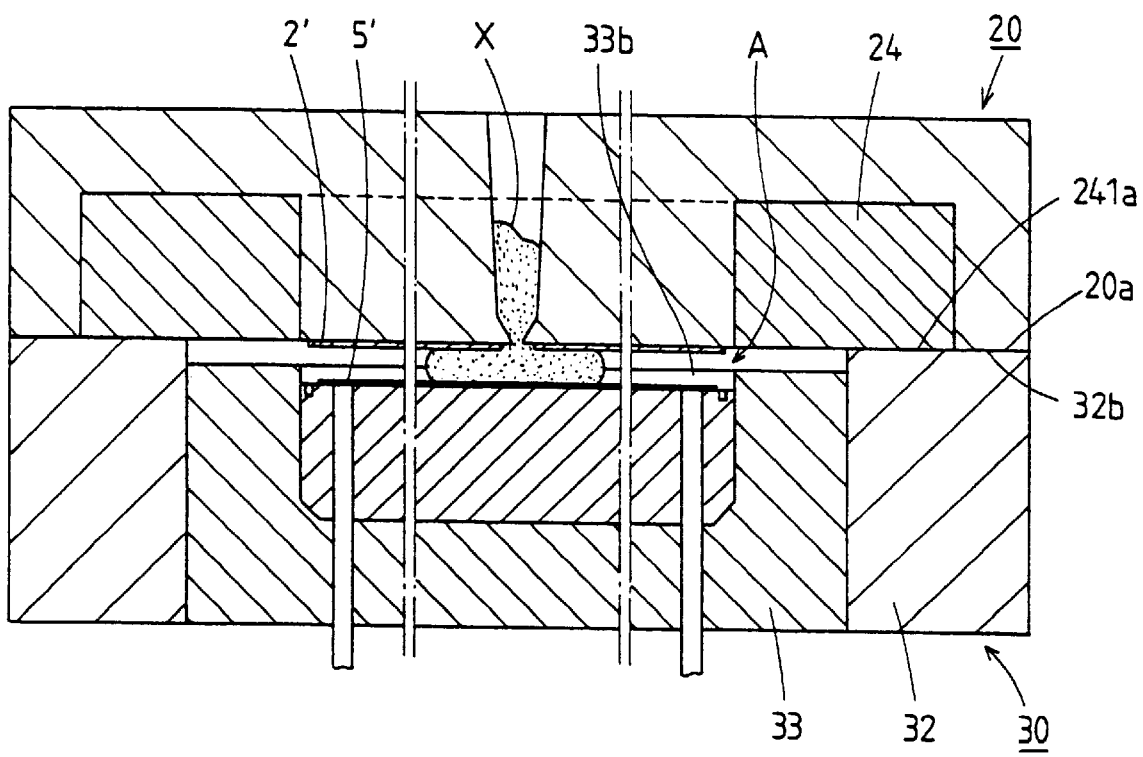
FIG. 8 is a sectional view of the manufacturing apparatus showing the condition after the first mold clamping out of the process of the manufacturing method using the manufacturing apparatus show in FIG. 6.

Next, under this condition, the movable mold 30 is shifted to the fixed mold 20 side and clamped, and as shown in FIG. 8, the end face 32b of the body 32 of the movable mold 30 is brought into contact with the end face 20a of the fixed mold 20 and the front end face 241a of the spacer 241 of the same face as the end face 20a. At this time, between the fixed mold 20 and the movable mold 30, there is formed a space A corresponding to the sum of the depth of the concave part 33b and the retracted amount of the piston 33 between the end face 20a of the fixed mold 20 and the bottom face of the concave part 33b of the piston 33 in the movable mold 30 side.

Figure 6:
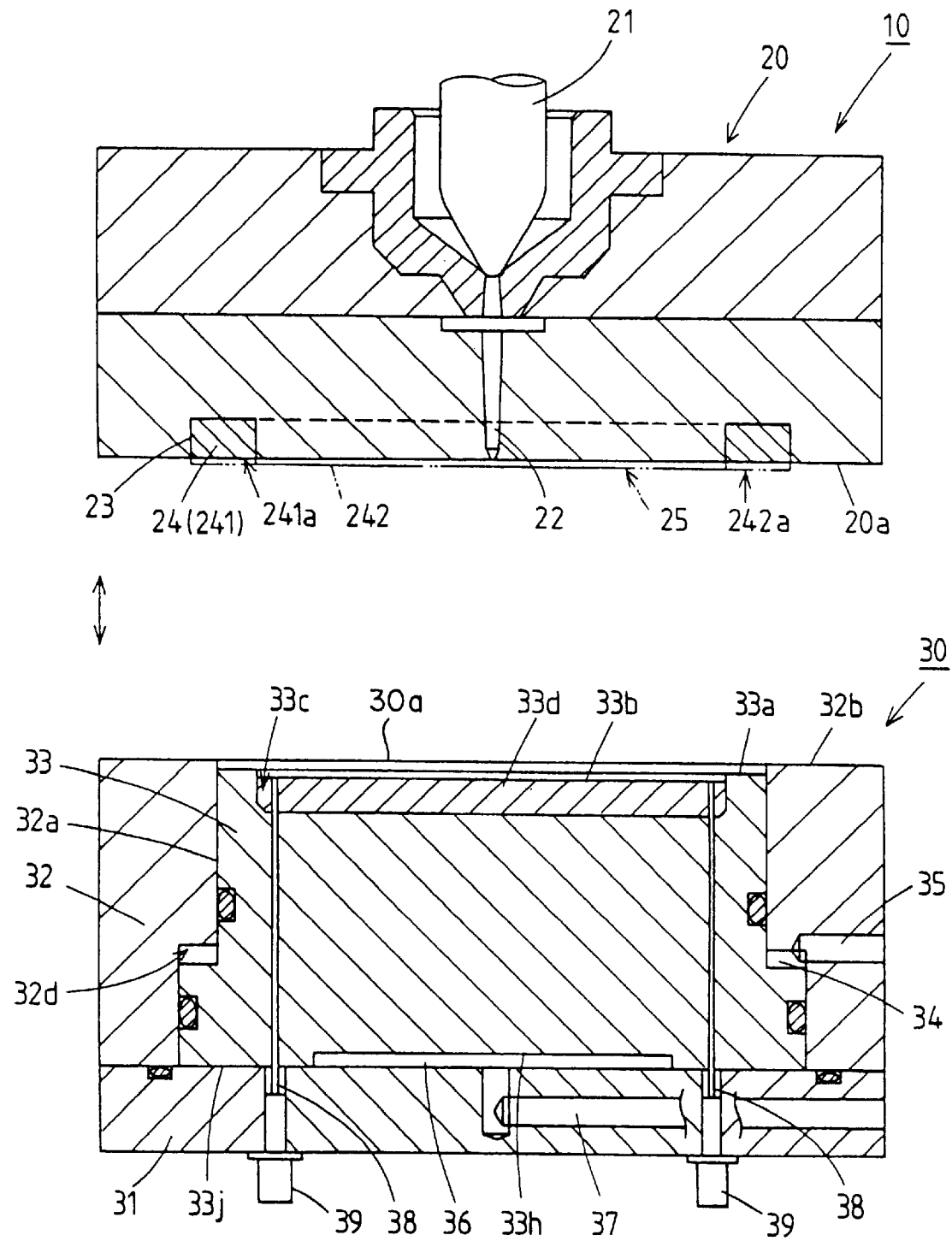
FIG. 6 is a schematic sectional view showing the constitution of an embodiment of the manufacturing apparatus of the present invention.

And, the molten resin X is injected from the nozzle 21 shown in FIG. 6 to inject the molten resin X into the space A through the central through hole 2'a of the circuit sheet 2' from the injection port 22 provided on the fixed mold 20. In this case, the amount to be injected of the molten resin X is that which is approximately equivalent to the volume of the concave part 33b of the piston 33.

Figure 9:
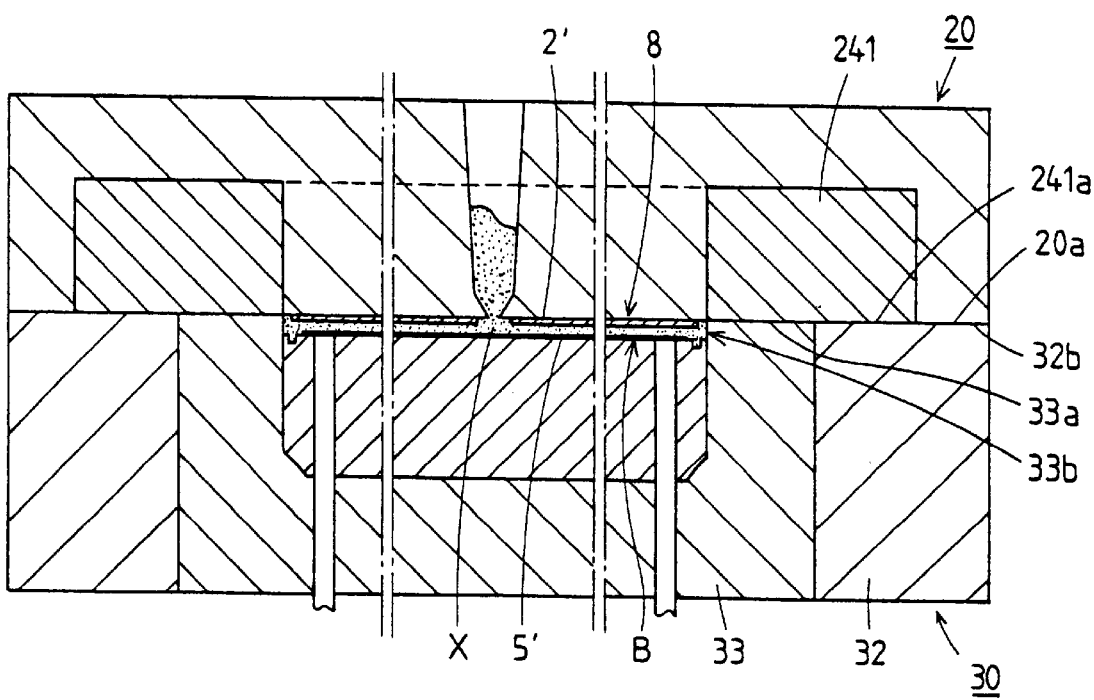
FIG. 9 is a sectional view of the manufacturing apparatus showing the condition of the first compression out of the process of the manufacturing method using the manufacturing apparatus shown in FIG. 6.

Next, by introducing the working pressure into the working pressure chamber for advance 36 in the movable mold 30 shown in FIG. 6, the piston 33 is advanced to bring the front end face 33a thereof into contact with the front end face 241a of the spacer 241 on the fixed mold 20 side as shown in FIG. 9. At this time, the space A is constricted to the cavity B formed by the concave part 33b and the end face 20a of the fixed mold 20, and the molten resin X injected in the space A is compressed to spread over the cavity B.

Since in this case a circuit sheet 2' is supplied to the end face 20a side of the fixed mold 20 of the cavity B and on the other hand a cover sheet 5' is supplied to the movable mold 30 side along the bottom face of the concave part 33b of the piston 33, the molten resin X is to be compressed between the circuit sheet 2' and the cover sheet 5' in the cavity B and filled. Accordingly, when the molten resin X is cured, there is obtained a molded product 8 formed with labeling on the circuit sheet 2' and the cover sheet 5' respectively, on both sides of the synthetic resin layer, so that the disk 7 on which the IC cards corresponding to FIG. 1 and FIG. 2 is formed.

Next, a method for manufacturing a disk 7 including the IC cards corresponding to FIG. 3 and FIG. 4 is explained with reference to FIG. 7 to FIG. 13.

The IC cards of this constitution are realized by adding the steps described below to the manufacturing process for the IC cards shown in the above FIG. 1 and FIG. 2.

Figure 10:
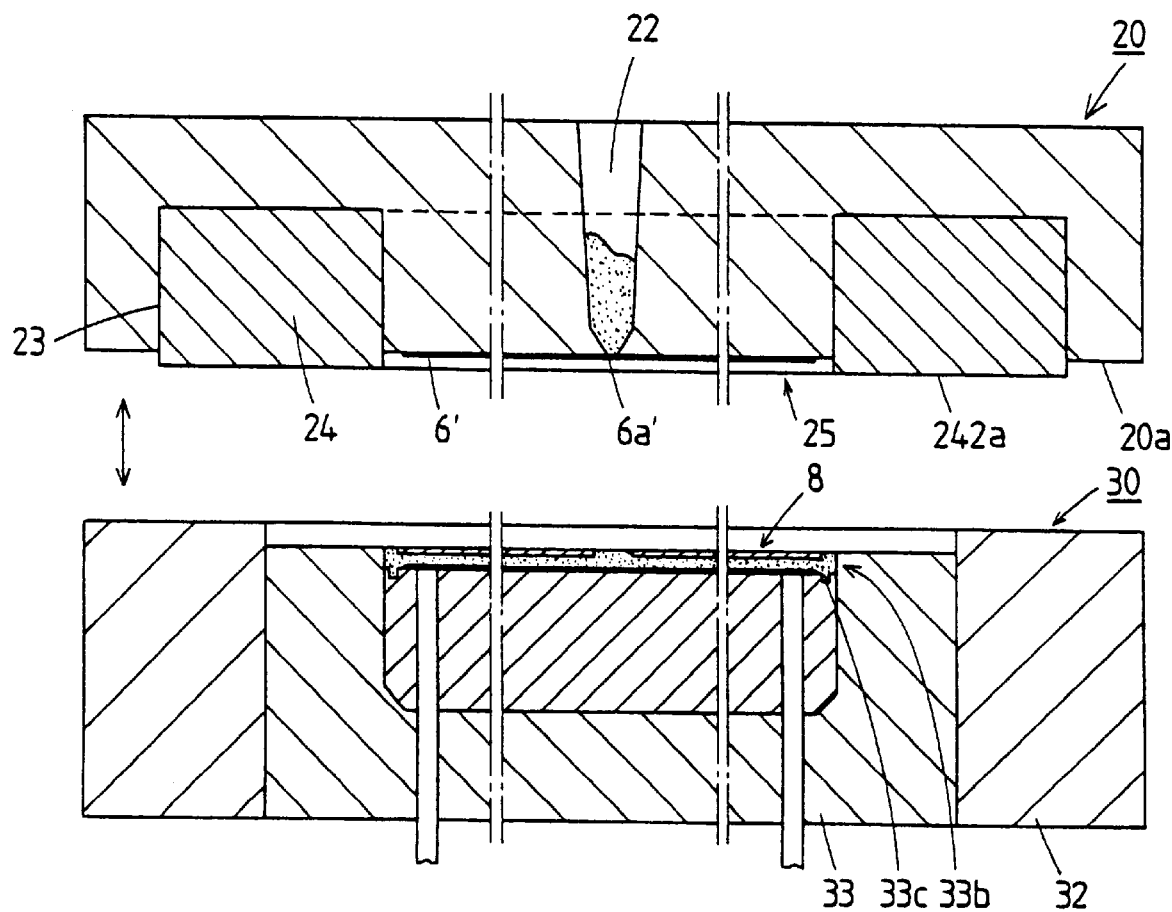
FIG. 10 is a sectional view of the manufacturing apparatus showing the condition prior to the second mold clamping out of the process of the manufacturing method using the manufacturing apparatus shown in FIG. 6.

Namely, the molding product 8 which is obtained by curing the molten resin X in the previous step becomes an intermediate molding product 8, and further, as shown in FIG. 10, the movable mold 30 is retracted to open, and the working pressure is supplied to the working pressure chamber for concave retraction 34 in the movable mold 30, as shown in FIG. 6, by which the piston 33 is retracted to the position in which the rear end face 33j of the piston is brought into contact with the base member 31. At this time, in the cavity B, the molten resin X runs into the small hole 33c which is provided in the peripheral part of the bottom face of the concave part 33b of the piston 33 and cured, by which the mold opening is to be made under the condition of the intermediate molding product 8 being held in the concave part 33b of the piston 33.

Also, under this mold opening condition, the annular spacer 241, which is engaged with the concave groove 23 in the end face 20a of the fixed mold 20, is replaced with the spacer for replacement 242, which is thicker than the spacer 241, to make the condition in which the front end face 242a of the spacer for replacement 242 projects by a predetermined amount from the end face 20a of the fixed mold 20. Further, along the bottom face of the concave part 25 formed on the end face 20a of the fixed mold 20 by the projection of the spacer for replacement 242, a circular cover sheet 6' for four IC cards is supplied. In this case, at the central part of the cover sheet 6' corresponding to the opening of the injection port 22 in the end face 20a of the fixed mold 20, a through hole 6a' for passing the molten resin is provided.

Figure 11:
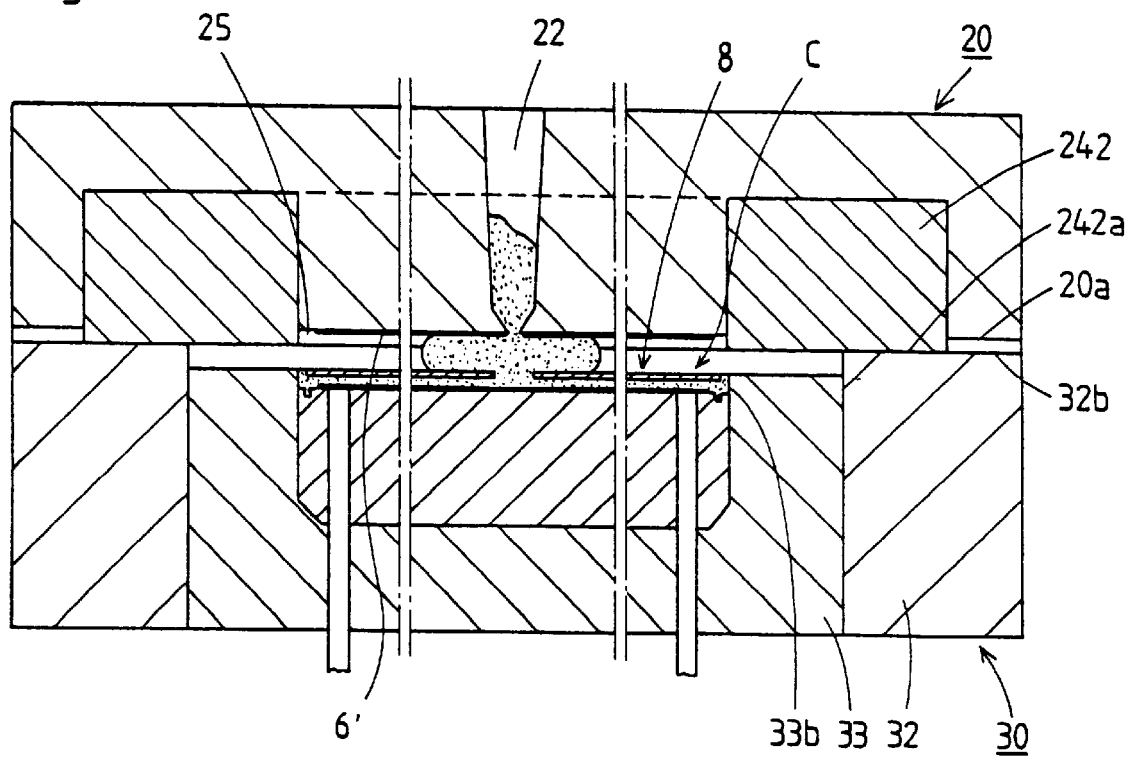
FIG. 11 is a sectional view of the manufacturing apparatus showing the condition after the second mold clamping out of the process of the manufacturing method using the manufacturing apparatus shown in FIG. 6.

Under this condition, next the second mold clamping is performed. As shown in FIG. 11, in this clamping, the end face 32b of the movable mold body 32 comes into contact with the front end face 242a of the spacer 242 which projects from the end face 20a of the fixed mold 20, and at this time, between the fixed mold 20 and the movable mole 30, there is formed a space C corresponding to the sum of the depth of the concave part 25 and the retracted amount of the piston 33 between the bottom face of the concave part 25 formed by a spacer for replacement 242 and the end face 20a of the fixed mold 20 and the surface of the intermediate molding product 8 held in the concave part 33b of the piston 33 of the movable mold 30.

And, the molten resin X is again injected from the nozzle 21 shown in FIG. 6 to inject the molten resin X into the space C through the central through hold 6a' of the cover sheet 6' from the injection port 22 provided on the fixed mold 20. In this case, the amount to be injected of the molten resin X is that which is approximately equivalent to the volume of the concave part 25 formed by the spacer for replacement 242 and the end face 20a of the fixed mold 20.

Figure 12:
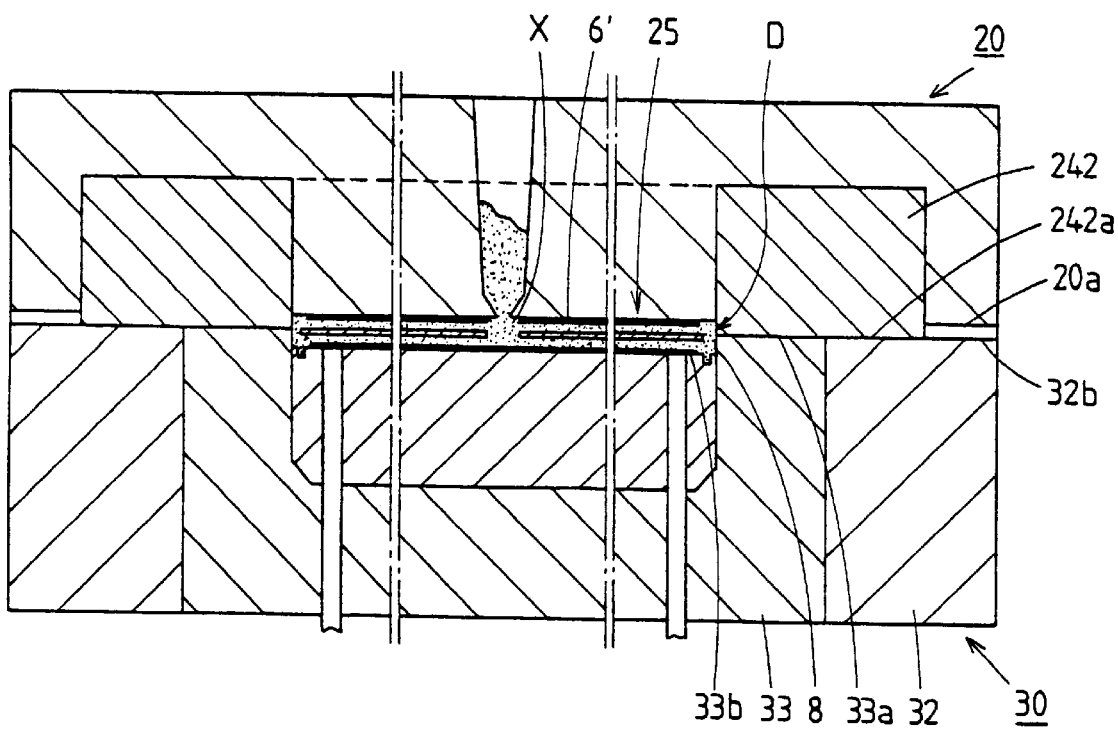
FIG. 12 is a sectional view of the manufacturing apparatus showing the condition of the second compression out of the process of the manufacturing method using the manufacturing apparatus shown in FIG. 6.

Next, as shown in FIG. 12, in the same manner as at the time of the previous injection compression, by introducing the working pressure into the working pressure chamber for advance 36 in the movable mold 30, the piston 33 is advanced to bring the front end face 33a thereof into contact with the front end face 242a of the spacer 242 on the fixed mold 20 side. At this time, the space C shown in FIG. 11 is constricted to the cavity D formed between the concave part 25 and the intermediate molding product 8 held in the concave part 33b of the piston 33 on the movable mold 30 side, and according to this, the molten resin X injected in the space C is compressed to spread over the cavity D.

Since, in this case, a cover sheet 6' is supplied along the bottom face of the concave part 25 on the fixed mold 20 side of the cavity D, in this cavity D, the molten resin X is to be filled by compression between the intermediate molding 8 and the cover sheet 6'.

Figure 13:
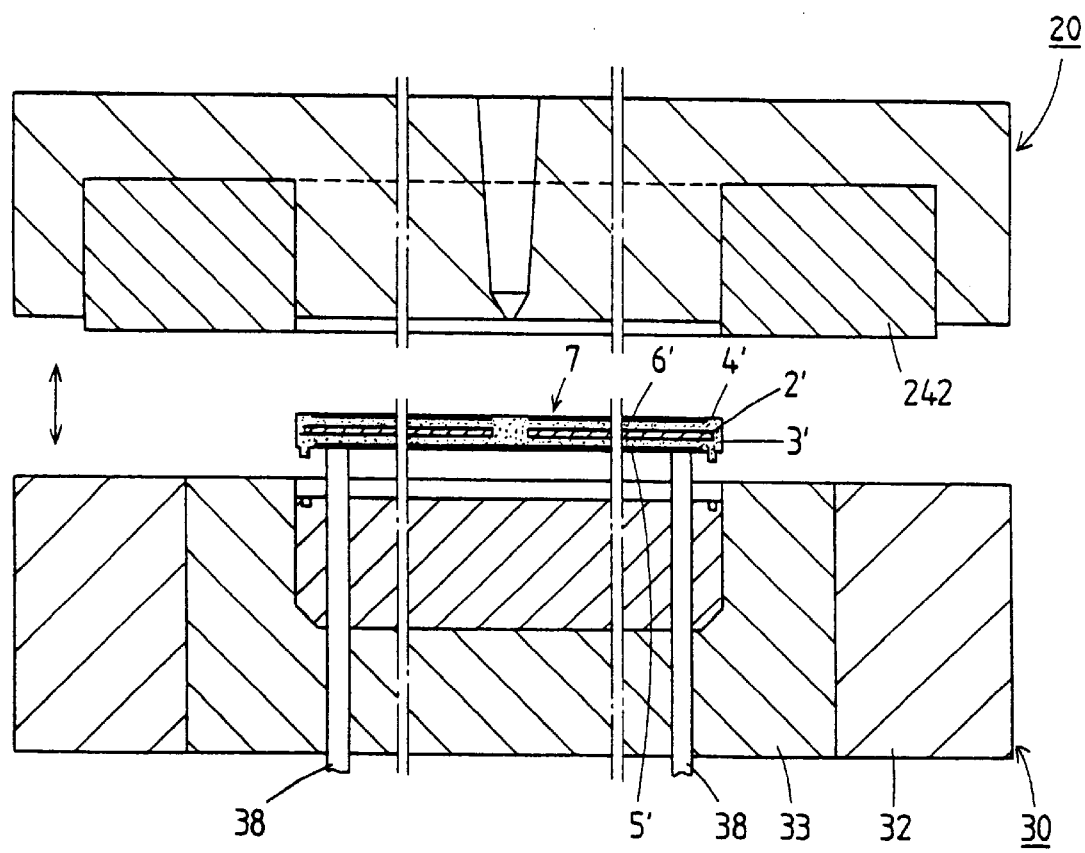
FIG. 13 is a sectional view of the manufacturing apparatus showing the process of taking out an IC card product after molding and curing in the process of the manufacturing method using the manufacturing apparatus shown in FIG. 6.

Subsequently, when the molten resin X is cured, as shown in FIG. 13, the eject pins 38 . . . 38 provided on the movable mold 30 are projected, a disk 7 having adhesion of cover sheet 5', 6' to the synthetic resin layer 3' formed on the surface on the circuit constitution side and the synthetic resin layer 4' formed on the base film side, respectively, can be obtained.

And, by cutting the resulting disk 7 in a predetermined shape as shown in FIG. 5, four IC cards 1 . . . 1 are to be obtained.

In the above manufacturing apparatus 10, when the first compression molding is completed and molds are opened, the spacer 24 is to be replaced from the spacer 241 whose front end face is to be of the same surface as the end face 20a of the fixed mold 20 to the spacer for replacement 242 whose front end face is to project from the end face 20a of the fixed mold 20 by a predetermined amount. However, the spacer 241 may be moved to make the front end face 241a thereof project.

Figure 14:
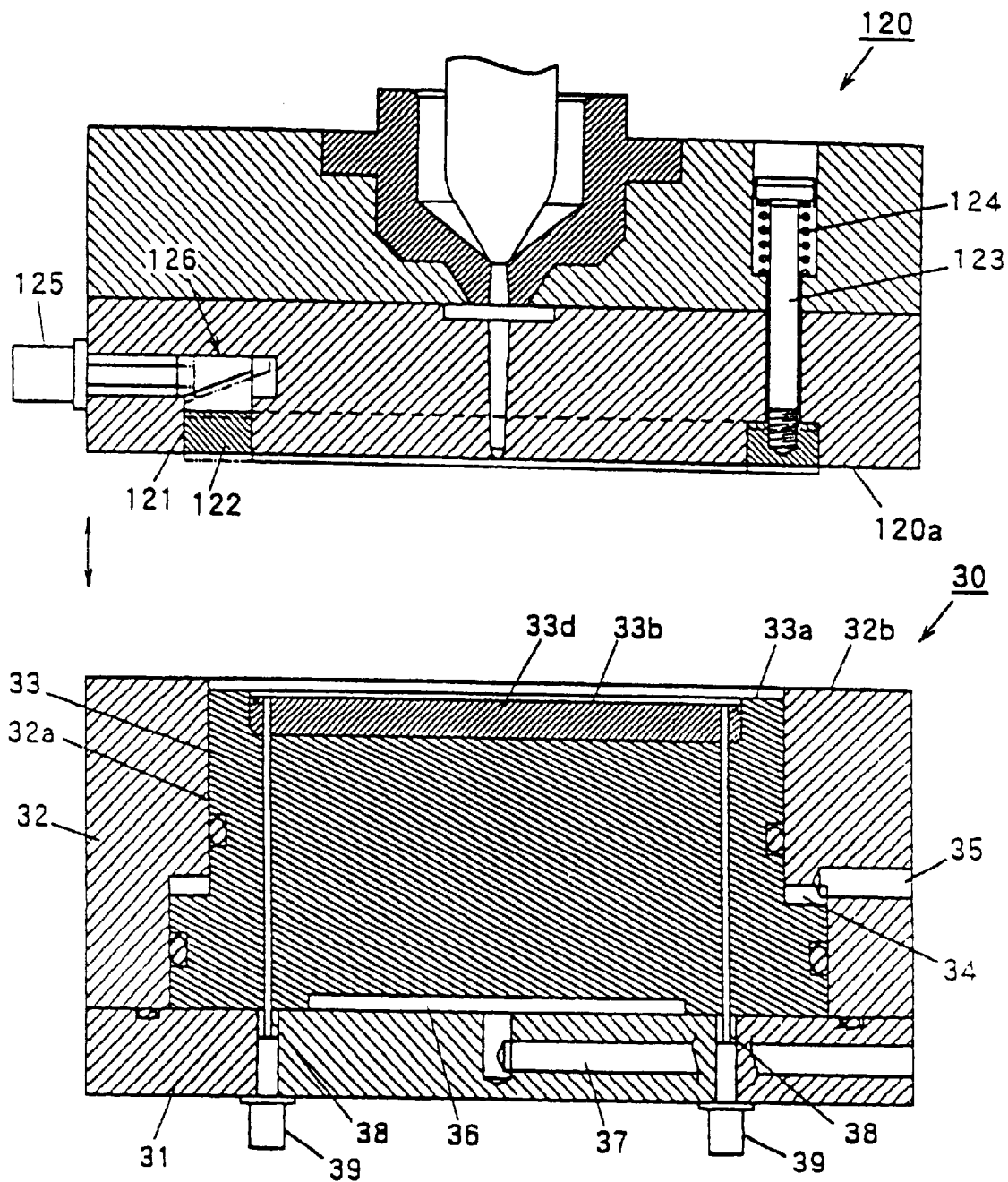
FIG. 14 is a schematic sectional view showing the constitution of other embodiment of the manufacturing apparatus of the present invention.

In this case, as shown in FIG. 14, in an annular concave groove 121 formed on the front end face 120a of the fixed mold 120, an annular spacer 122 is freely movably engaged, and the spacer 122 is forced backward by the spring 124 which is fitted between the bolt member 123 provided on the rear face of the spacer 122 and the fixed mold 120. Alternatively, constitution may be such that a cylinder 125 is provided on the lateral side of the fixed mold 120, and when the rod of the cylinder 125 is projected, the spacer 122 is pushed forward against the force of the spring 124 through the cam mechanism 126.

According to this constitution, when the compression molding of the synthetic resin layer to one surface of the circuit sheet is completed and molds are opened, the cylinder 125 is operated to project the front end face of the spacer 122 from the end face 120a by a predetermined amount, thereby forming a necessary concave part inside thereof. Accordingly, it becomes possible to apply compression molding of the synthetic resin layer to the other face of the circuit sheet without requiring the spacer replacement as described above.

In the foregoing description, it is so arranged that the cover sheets 5', 6' are to be supplied before the first mold clamping and second mold clamping, respectively, but instead of doing so, it may be so arranged as to supply a transfer film and transfer a prescribed pattern, or the like, onto the surface of the synthetic resin layer from the transfer film simultaneously with the compression molding, or if it is possible to print color, pattern, character, design, etc. directly on the surface of the synthetic resin, these cover sheets 5', 6' or supply of transfer film may be omitted.

On the other hand, if the product is taken out at the time when the first compression molding is over and the mold is opened, then there may be obtained an IC card wherein the synthetic resin layer is formed only on the surface of the circuit carrying side of the circuit sheet 2', the cover sheet is affixed as necessary to the surface, or the patterns are transferred from the transfer film.

Furthermore, although the foregoing explanation refers to the case of manufacturing the disk 7 which can cover the yield of four IC cards, similar procedures may be taken in the case of manufacturing the IC card sheet by sheet, or a plurality of cards other than four sheets at a time. Especially, in case of yielding a plurality of sheets, the disk may be formed in rectangular shape, in which case the piston end face becomes rectangular, and the spacer has a rectangular hollow part.

What is claimed is:

1. A method for manufacturing a card product in which a circuit carrying surface of a circuit sheet made by carrying an electric circuit on a base film is coated with a synthetic resin layer in a molding device including a fixed mold having an injection hole for injecting a molten resin and a movable mold having a concave part of a predetermined depth, said concave part being defined in an end face of a piston disposed opposite to the fixed mold and operative for reciprocating sliding motion with respect to the movable mold in the direction of an end face of the fixed mold, the movable mold being operative to freely extend toward and away from the fixed mold, comprising the steps of:

retracting the end face of the piston by a predetermined amount from the end face of the movable mold and supplying the circuit sheet in a manner that the base film thereof comes into tight contact with the end face of the fixed mold which is opposite to the concave part at the end face of the piston;

moving the movable mold with respect to the fixed mold for clamping the fixed mold and the movable mold with said base film and circuit sheet in place;

injecting into a space between the circuit sheet brought into direct contact with the end face of the fixed mold and the concave part in the movable piston end face, the molten resin of an amount corresponding to the volume of the space;

sliding the piston towards the fixed mold so that the end face of the piston comes into direct contact with the end face of the fixed mold to form a cavity while compressing the molten resin injected into the space between the circuit sheet and the concave part in the piston to spread the molten resin over the cavity constituted by the concave part of the piston end face and end face of the fixed mold;

curing the molten resin to form a molding product; and opening the molds.

2. A method for manufacturing a card product according to claim 1, wherein, prior to the clamping, a cover sheet is supplied to a bottom face of the concave part of the piston end face.

3. A method for manufacturing a card product according to claim 1, wherein, prior to the clamping, a transfer film is supplied to a bottom face of the concave part of the piston end face.

4. A method for manufacturing a card product in which a circuit carrying surface of a circuit sheet made by carrying an electric circuit on a base film is coated with a synthetic resin layer in a molding device including a fixed mold having an injection hole for injecting a molten resin and a movable mold having a concave part of a predetermined depth, said concave part being defined in an end face of a piston disposed opposite to the fixed mold and operative for reciprocating sliding motion with respect to the movable mold in the direction of an end face of the fixed mold, and the movable mold being operative to freely extend toward and away from the fixed mold, comprising the steps of:

retracting the end face of the piston by a predetermined amount from the end face of the movable mold and supplying the circuit sheet in a manner that the base film thereof comes into tight contact with the end face of the fixed mold which is opposite to the concave part at the end face of the piston;

moving the movable mold with respect to the fixed mold for clamping the fixed mold and the movable mold with the base film and circuit sheet in place;

injecting into a space between the circuit sheet brought into direct contact with the end face of the fixed mold and the concave part in the movable piston end face, the molten resin of an amount corresponding to the volume of the space;

sliding the piston towards the fixed mold so that the end face of the piston comes into direct contact with the end face of the fixed mold to form a cavity while compressing the molten resin injected into the space between the circuit sheet and the concave part in the piston to spread the molten resin over the cavity constituted by the concave part of the piston end face and end face of the fixed mold;

curing the molten resin to form an intermediate molded product in which one side surface of the circuit sheet is coated with a synthetic resin layer;

opening the molds;

retracting the end face of the piston by a predetermined amount from the end face of the movable mold while holding the intermediate molded product in the concave part defined in the movable mold piston;

providing the end face of the fixed mold with a projecting surface defining a concave part thereon opposite the concave part of the movable mold; clamping the fixed mold and the movable mold so as to bring the end face of the movable mold into direct contact with the end face of the fixed mold so that the fixed mold concave part and the intermediate product in the movable mold concave part cooperate to form a cavity;

injecting the cavity formed by the cooperation of the fixed mold concave part and the intermediate molded product a molten resin of an amount corresponding to the volume of the cavity;

sliding the piston toward the fixed mold so that the end face of the piston comes into direct contact with the projecting surface of the fixed mold while compressing to molten resin again to spread the molten resin over the cavity constituted by the concave part formed on the end face of the fixed mold and the intermediate molded product;

curing the molten resin to form a final molding product; and opening the molds.

5. A method for manufacturing a card product according to claim 4, wherein prior to the first clamping, a cover sheet is supplied to a bottom face of the concave part of the piston end face, and prior to the second clamping, a cover sheet is supplied to a bottom face of the concave part of the fixed mold.

6. A method for manufacturing a card product according to claim 4, wherein, prior to the first clamping, a transfer film is supplied to a bottom face of the concave part of the piston end face, and prior to the second clamping, a transfer film is supplied to a bottom face of the concave part of the fixed mold.

* * * * *